Figure 1:
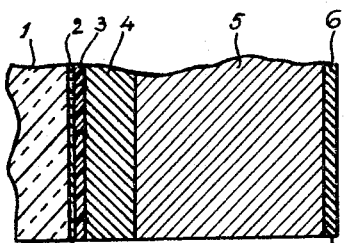

Aug. 23, 1966     E. RESCHAUER     3,268,755
CURRENT-ELECTROLUMINESCENCE DEVICE HAVING
A HIGH RESISTANCE LAYER
Filed March 23, 1962

Egbert Reschauer
INVENTOR.

BY Wendroth, Lind
and Ponack, Attorneys

United States Patent Office 3,268,755
Patented August 23, 1966

3,268,755
CURRENT-ELECTROLUMINESCENCE DEVICE
HAVING A HIGH RESISTANCE LAYER
Egbert Reschauer, Delft, Netherlands, assignor to N. V.
Optische Industrie "De Oude Delft," Delft, Netherlands
Filed Mar. 23, 1962, Ser. No. 182,067
Claims priority, application Netherlands, Mar. 30, 1961,
263,133
1 Claim. (Cl. 313—108)

The invention relates to a device for the production of current-electroluminescence. In such a device electroluminescence is generated by means of passage of a D.C. or eventually an A.C. current in a layer of a suitable luminescent material (phosphor) which is placed between electrodes, of which at least one is transparent. Devices for current-luminescence differ from the more familiar alternating field-luminescent cells, also called luminescent capacitors, and which exhibit no useful reaction on D.C. voltage, by the fact that a transport of electric charge from one electrode to the other occurs upon application of a voltage.

Devices for current-luminescence are known. Usually, they make use of semiconducting phosphors, especially large mono-crystals, which are in direct contact with the electrodes so that the current flowing through the separate crystals makes them luminesce. Further it is known in current-luminescent cells having a semiconducting phosphor layer, to prevent the current through individual phosphor particles from burning out the particles by means of a resistance layer combined with the phosphor layer. (See U.S. patent specification No. 2,880,346.)

In the current-luminescent devices hitherto known the phosphor particle (crystal or grain) constitutes the direct, conductive connection between the electrodes, or between an electrode and the resistance layer.

According to the invention, on the contrary, a very thin layer of a highly insulating material is applied on at least one side of the phophor layer, preferably between the phosphor layer and the transparent electrode, such that in the thin layer a high electric field strength is built up when the operation voltage is applied. It could be observed that the intensity of the light emission from a current-luminescent cell built in this way, is considerably higher than the emission from comparable, known current-liminescent cells. No detailed explanation could be found yet for the phenomena responsible for the increased intensity and which occur in the thin layer of insulating material and the surface layer of the phosphor adjacent to it. Though, of course, the thin layer in operation will conduct the load current of the cell, it will be termed "insulator layer" hereinafter, due to the insulating properties of the material it is made of. As already mentioned, in the known current-luminescent cells, the cell voltage is applied directly over the phosphor layer, or eventually, over the series connection of the latter and a current limiting resistance layer formed of a semiconducting material. If a very thin layer of highly insulating material the resistivity of which is some orders of magnitude higher than those of the phosphor and the resistance material (both semiconductors) is applied between the phosphor layer and the electrode a large portion of the cell voltage is concentrated on the insulator layer and a high field strength occurs in this layer. If it is supposed e.g. that the insulator layer has a thickness of about one tenth of that of the phosphor layer the field strength in insulator layer will be practically ten times that occurring in the phosphor layer of a cell without the insulator layer according to the invention. Apparently, this increased field strength influences the adjacent part of the phosphor layer in such a way that the experimentally observed increase of the intensity of the light emission results. It is known to apply an insulating layer between an electrode and the phosphor layer in alternating field-luminescent cells. However, the sole purpose of such known layers is to prevent the flowing of a current through the more or less conductive phosphor particles from one electrode to the other. Consequently, the known layer is not subjected to a field strength as high as is the insulator layer in the current-luminescent device according to the invention. It is advantageous to apply the insulator layer between the transparent electrode and the phosphor layer for in that case most of the luminescent light has to pass the insulator layer only. However, it is also possible to apply, eventually, in combination with the layer on the transparent electrode, an insulator layer on the side of the phosphor layer not joining the transparent electrode.

In operation of a cell according to the invention it appears that, due to local differences in conductivity, there is a risk either of an irregularly divided luminescence or of local break-downs due to too high local currents if cell voltage is increased. In analogy with the proposal set forth in the U.S. patent specification No. 2,880,346 for the known current-luminescent cells, this risk can be avoided by the use of semiconducting materials which are either dispersed in the phosphor layer or applied as a separate layer, and which limit the current though the phosphor layer. According to the invention the resistance per surface unit of the insulator layer when the cell is not in operation, exceeds with at least one order of magnitude the corresponding total resistance of the remaining layers. The resistance layer is to bring about a voltage drop on places exhibiting an increased conductivity, and is preferably applied as a separate layer between the phosphor layer and the counter electrode.

The insulator layer can be made as a lacquer layer, or may be formed by vacuum-depositing known insulating materials. Also, in some cases, the layer may be a gas layer. Especially in the case that the insulator layer is formed by a gas its characteristics could be compared with those of a gas discharge path. With the gas discharge in rest, when no or only a very small current flows, the resistance of the gaseous medium between the electrode is a multiple of that of the stabilizing series resistor. Similarly, the resistance in rest of the insulator layer of the current-luminescent device according to the invention is high in comparison with the series resistance offered by the other layers. After a voltage is applied and the field strength in the discharge path exceeds a certain value, the resistance will decrease and an electric discharge will start which has a falling voltage vs. current characteristics and which must be stabilized by the series resistor. In operation, such a falling resistance characteristic also appears in a device according to the invention, which characteristic may be intensified, eventually, by the effect of a certain photoconductivity of the phosphor. The resistance layer mentioned before fulfils in this case the function of the series resistor in the case of the gas discharge described by way of comparison.

In a preferred embodiment of the invention the insulator layer is formed as a coherent layer into which the phosphor particles adjacent to this layer are partly embedded. This condition is satisfied not only by the device having a gas as the insulating medium but e.g. also by such cells in which the insulator layer consists of a lacquer or resin which is sufficiently soft or deformable such that the phosphor grains can be slightly pressed into the layer. The phosphor grains are irregular in shape and have to some degree sharp points and edges penetrating the lacquer or resin layer without, of course, contacting the electrode. On such points and edges a certain concentration of electric field lines, that means an increased field strength occurs which, according to experience, results in a further increase of the brightness in these mostly sharply limited areas distributed over the cell surface.

The thickness of the insulator layer depends upon the admissable voltage load of the material used. Insulators having a very high resistivity and high thermal stability, and which are applied as homogeneous pore free very thin layers give the best results. The working voltage of the cell can vary, in principle, from a few volts up to very high voltages. It will be clear, that the thickness of the insulator layer to be taken depends not only upon the qualities of the insulating material but also upon the working voltage. A thickness for the insulator layer less than 10 μm. per 100 volts of the cell voltage and a resistivity higher than $10^{10}$ ohm cm. for the insulating material have proved to be suitable.

Preferably, the phosphor layer is made as a single layer of phosphor grains, as it could be ascertained that in the device according to the invention, the current-luminescence is produced predominantly at the separating surface between the phosphor layer and the insulator layer. Under certain circumstances it may be advantageous, however, to apply the semiconducting phosphor in a thicker layer, in which case the phosphor may serve as a resistance layer. However, it is a condition therefor, that the phosphor has a small photoconductivity, for otherwise by feed back of the electroluminescent radiation the resistance of the layer would progressively fall and breakdowns would likely occur.

Comparing a current-luminescent cell built in accordance with the invention to the well-known alternating field-luminescent devices an important improvement of the light efficiency can not be expected from the first type of cell, due to the heat losses connected with the passage of current. However, an important feature of the device according to the invention resides in the fact that it makes possible to generate a sufficiently intense elecroluminescence by means of an electric current, particularly a D.C. current. This fact offers special advantages when applying the idea of the invention to a number of important technical devices in which electroluminescent cells are combined with photoconductors to form solid state image converters, image intensifiers and image storage devices. This type of devices, if A.C. operated, has the disadvantage of having a large capacitance due to the small layer thicknesses desirable for a good image quality. In order to obtain the high light intensity desired, voltages of relatively high frequency should be applied. Accordingly, even if photoconductors having a very high dark-resistance are used, a considerable voltage drop will occur in the phosphor layer which will result in a disturbing base luminescence, i.e., luminescence in the absence of primary radiation. The device according to the invention is free from this disadvantage.

A further advantage of the current-luminescent device according to the invention is the particular, that a perceptible luminescence occurs only at a relatively high current density (e.g. of the order of 10 to 100 μa./cm.$^2$), a relatively small increase of the current density (e.g. by a factor 10) then being sufficient to obtain normal brightness. Due to this the photoconductor can be selected such that the dark-current is only slightly lower than the value at which a certain base luminescence would occur. This pre-load current may strongly reduce the time lag inherent to the previous solid-state image devices, i.e., the delay with which the luminescent image is built up after application of the primary radiation. Thus, new fields of use may be entered. Furthermore, as the photoconductor may have a relatively low resistance, the photoconducting layer can be thin and the resolving power may be improved.

Figure 2:
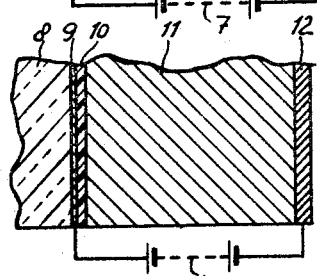

Some examples of devices according to the invention will be described in greater detail with reference to the schematic drawing in which:

FIG. 1 illustrates a first form of a luminescent cell;

FIG. 2 another form of such a cell, and

Figure 3:
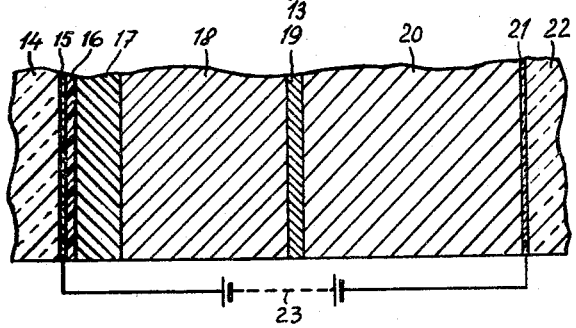

FIG. 3 a solid state image converter, image intensifier or image storage device.

In FIG. 1, item 1 is a plate of glass, provided on one side with a transparent conductive layer 2. In accordance with the invention a very thin, transparent layer 3 of material having insulating properties, is applied to glass plate 1. This layer can be formed e.g. by pouring or spraying a solution of ureaformaldehyde resin on the plate and drying the same after that. The layer may also be deposited in vacuo, however, and then consist of an insulating material suitable for that purpose such as quartz. It is further possible that the insulator layer is formed of a gas, e.g. air, in which case between the phosphos layer 4 and the electrode 2 a small gap is maintained with known means such as a fine, grid-like quartz layer of desired thickness applied on the electrode 2.

The thickness of the insulator layer depends on the operating voltage and may be e.g. 5 μm. at a cell voltage of 500 volts. For layer 3 preferably a material is used combining a specific resistance of $10^{10}$ ohm cm. or if possible even considerably higher, with a sufficient thermal stability.

Upon the insulator layer 3 a phosphor layer 4 is applied in any well-known manner, such as by sedimentation. Preferably this layer 4 consists of a single layer of grains so that its thickness is determined by the size of the grains of the material used and lies between e.g. 20–100 μm. Many known phosphors with sufficient conductivity can be used in the device according to the invention. Of course, first of all such phosphors may be applied which are already known as current-luminescent per se such as manganese activated zinc sulphide (ZnS:Mn). In the case of an insulator layer consisting of a gas or of a material which is deformable when the phophor layer is applied such as some lacquers or resins, the phosphor grains more or less penetrate the insulator layer which has a fovourable effect on the intensity of the light. However, this is not necessary so that vary hard layers are useful too.

After the phosphor grains have been bonded, eventually, by means of some lacquer, a relatively thick layer 5, consisting of a resistance material, is applied. As such a material many well-known semiconductors e.g. semiconducting metal oxides as ZnO, TiO$_2$ and SnO$_2$ may be used which can be applied by known methods, e.g. by sedimenting, screen printing or depositing in vacuo. It may be suitable to use a white material such as TiO$_2$ in order to reflect the light which is radiated backwards. The thickness of the resistance layer 5 depends as well on the resistivity of the material as on the other data of the cell. As a rule, the resistance per surface unit of the cell must be such that, in operation, the current density will be limited to a value admissible in respect of thermal conditions. In a practical device a resistance in the order of $10^5$ ohm per cm.$^2$ of the cell surface at a cell voltage of 500 volts appeared to be suitable. To obtain this value a layer of TiO$_2$ of about 150 μm. was necessary.

Finally, the rear surface of the resistance layer is provided with a counter electrode 6, which is not necessarily transparent. This electrode may consist e.g. of aluminum and can be formed by vacuum-depositing.

A suitable electric voltage is applied to the electrodes 2 and 6. Preferably, the device is supplied with a D.C. current from a current source 7, which current may be pulsating under circumstances. In principle, however, as the device is a current-luminescent cell, it can be supplied with an A.C. current too. In this case, a marked difference with the alternating field cells will appear in that, as a rule, a certain decrease in luminescence will occur with increasing frequency whereas, as is well-known, the intensity of field-luminescent cells rises with increasing frequency.

In the case of D.C. supply the positive terminal is preferably connected to the electrode 2, adjacent the insulator layer 3, because experience has shown that then the highest light intensity and a uniform distribution of the luminescence is obtained.

FIG. 2 shows a current-luminescent device in accordance with the invention in which the transparent electrode 9 on the glass support 8 and the insulator layer 10 are similar to those of the cell of FIG. 1. The form of FIG. 2 is distinguished from that of FIG. 1, however, in that between the insulator layer 10 and the counter electrode 12 only a single layer 11 is provided. This layer consists of a phosphor and has a thickness which is a multiple of the maximum grain size of the phosphor. To the phosphor suitable semiconducting substances may be added in such quantities that the resulting resistance of the layer has a suitable value. In this form of device the phosphor itself, eventually in cooperation with the resistance material added thereto, serves as the current limiting means. As observed hereinbefore, the phosphor must have no or only very little photoconductivity. Such a phosphor may consist e.g. of mixed crystals of zinc sulphide and zinc oxide or may be a zinc sulphide phosphor which has got the required conductivity by superficial enriching with copper sulphide.

FIG. 3 illustrates the use of the device according to the present invention as an image converter, image intensifier or image storage device. The image forming part of the device shown is similar to the electroluminescent cell shown in FIG. 1 and comprises the glass plate 14, the transparent electrode 15, the insulator layer 16, the phosphor layer 17 and the resistance layer 18. The current through each point of the cell and the brilliance of such points is now controlled by means of a photoconducting layer 20 connected electrically in series with the current-luminescent cell, upon which layer the primary radiation may be incident from the right. As is well-known the local resistance of the photoconducting layer 20 is decreased dependent on the incident radiation intensity, the dark-resistance of the layer having a value such that in the absence of primary radiation no appreciable initial luminescense is produced.

The photoconductor may be selected in accordance with principles well-known in the art dependent on the type of the primary radiation. For X-rays e.g. cadmium sulphide, for infra-red rays lead sulphide will be suitable. The thickness of the layer usually will be a few hundreds μm.

In FIG. 3 the resistance layer 18 and the photoconducting layer 20 are separated by a layer 19 consisting of a light absorbing material such as carbon suspended in a synthetic resin and which serves to intercept backward radiation of the luminescent cell towards the photoconducting layer and thus to avoid spontaneous luminescence. This layer 19 may be omitted, of course, if the photoconductor is insensitive for the light radiated by the phosphor 17 or in case the resistance layer 19 is opaque for such light. Should the device serve as an image storing device, that is to say, should a luminescent image formed therein be stored for use after the primary radiation has died away, then feed back of the luminescent radiation is necessary and must not be prevented by a layer 19.

On the side of the primary radiation the cell according to FIG. 3 has a counter electrode which is applied as a conducting layer 21 on the glass support 22. Of course, this electrode must be transparent for the primary radiation. The cell has its energy supplied from a D.C. current source 23.

What I claim is:

An electroluminescent device comprising a first planar transparent conductive electrode, a stratum consisting of photoconductive material in contact with said first electrode, a stratum consisting of a resistive material in electrical contact with said stratum of photoconductive material, a stratum consisting of phosphor particles in contact with said stratum of resistive material, a stratum consisting of insulating material in contact with said stratum of phosphor particles, a second planar transparent conductive electrode in contact with said stratum of insulating material, means to apply a D.C. voltage between said first and second electrodes so that said second electrode is positive with respect to said first electrode, said stratum of insulating material having a thickness smaller than 10 microns per 100 volts of said D.C. voltage and being of an insulating material having a resistivity of at least $10^{10}$ ohm cm., the resistance per surface unit in non-operative condition of said stratum of insulating material exceeding the series resistance per surface unit of the remaining strata by a factor of at least 10.

References Cited by the Examiner

UNITED STATES PATENTS

| 2,880,346 | 3/1959 | Nicoll et al. | 313—108 |
| 3,043,978 | 7/1962 | Mager | 313—108 |
| 3,143,682 | 8/1964 | Clarke et al. | 313—108 |
| 3,173,050 | 3/1965 | Gurnee | 313—108 |

JAMES W. LAWRENCE, *Primary Examiner.*

ARTHUR GAUSS, GEORGE N. WESTBY, *Examiners.*

C. R. CAMPBELL, R. JUDD, *Assistant Examiners.*